May 3, 1960

A. P. TALBERT 2,935,140

COMBINATION WEEDING AND CULTIVATING
ATTACHMENT FOR A TOWING VEHICLE

Filed July 3, 1957

ABNER P. TALBERT
*INVENTOR.*

May 3, 1960

A. P. TALBERT 2,935,140

COMBINATION WEEDING AND CULTIVATING
ATTACHMENT FOR A TOWING VEHICLE

Filed July 3, 1957

ABNER P. TALBERT
INVENTOR.

United States Patent Office 2,935,140
Patented May 3, 1960

2,935,140

COMBINATION WEEDING AND CULTIVATING ATTACHMENT FOR A TOWING VEHICLE

Abner P. Talbert, Ridgefield, Wash.

Application July 3, 1957, Serial No. 669,836

1 Claim. (Cl. 172—118)

This invention relates to farming implements and more particularly to an attachment for a tractor or other suitable towing vehicle and operated by the prime mover of the tractor as well as the forward motion thereof to extirpate weeds and the like between row crops as well as between the crops themselves.

One of the principal objects of the invention is to provide an implement of the character described wherein a raking frame is hingedly attached at its forward end to the forward end of a wheel supported main frame and provided with tines for intermittent penetration into and withdrawal from the ground at intervals, the spacing of which is variable as determined by the speed of travel of the towing vehicle, the revolutions per minute of its prime mover and a variable speed power transmission between the prime mover and the raking frame.

The foregoing and other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
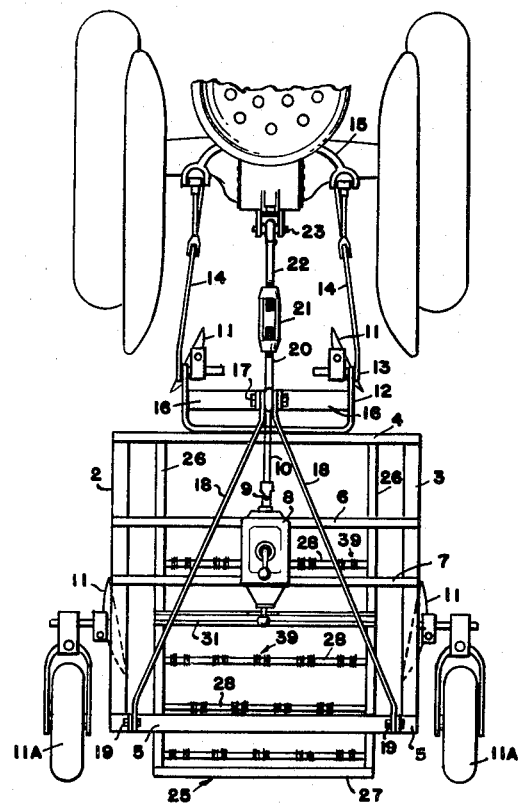
Figure 1 is a top plan view of the invention shown attached to a towing vehicle such as a tractor.
Figure 2:
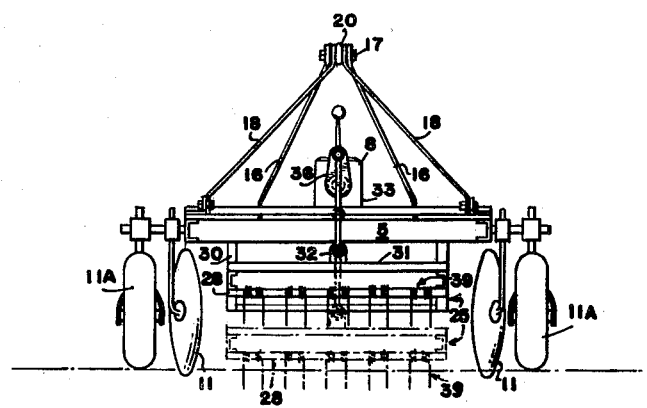
Figure 2 is a rear view of the invention detached from the towing vehicle.

Referring now more particularly to the drawings:

Reference numeral 1 indicates generally a main frame comprising parallel side members 2 and 3 interconnected at both of their ends by cross members 4 and 5 and also intermediate their ends by parallel cross members 6 and 7 which latter members provide a support for a variable speed power transmission means 8 of the automotive type. The power transmission means is connected by a universal joint 9 to one end of a drive shaft 10 whose opposite end is similarly connected to the engine or to a power take-off (not shown) of the towing vehicle.

The main frame 1 is provided at its forward and rearward ends with vertically adjustable harrow discs 11 and supported at its rearward end by similarly adjustable supporting wheels 11A. A bracket 12 is secured to and extends forwardly from the front cross member 4 and is pivotally connected as at 13 to the ends of conventional lifting arms 14 of a tractor.

Secured to the arms of the bracket 12 is a pair of upwardly converging braces 16 united by a pin 17 with the top forward ends of a pair of rearwardly and downwardly diverging braces 18 whose bottom rear ends are secured as at 19 to opposite corners of the main frame 1. Said top ends of both pairs of braces are also pivotally attached by the pin 17 to the rear end of a threaded shaft 20 connected by a turnbuckle 21 to the rear end of a similarly threaded shaft 22 whose opposite end is pivotally attached as at 23 to the rear axle housing of the tractor. By this arrangement the main frame may be raised and lowered relative to the ground as shown in full and broken lines in Figure 3.

A raking frame indicated generally at 25 comprises parallel side members 26 interconnected at both of their ends by cross members 27 and intermediate their ends by spaced apart rods 28. The forward end of the raking frame is hingedly attached as at 29 to brackets 30 secured to and depending from the forward end of the main frame 1. The frame members 26 are further interconnected by a cross member 31 to which is pivotally attached as at 32 the bottom end of a pitman 33 whose top end is provided with a socket 34 and thereby connected to a ball fitting 35 carried by an eccentric plate 36 secured to a driven stub shaft 37 extending rearwardly from the transmission 8. It will be noted in Figure 3 that the spacing between the forward ends of the auxiliary and main frames is fixed by the length of the brackets 30 and that the spacing between the rearward ends thereof is variable to the extent of the throw of the eccentric 36, which is equal to twice the length of the brackets 30. As a consequence thereof, when the forward end of the main frame is tilted downwardly to lower the auxiliary frame into an operative position, the latter will terminate in its downward swing in a position parallel to the ground, with all of the tines at a uniform depth of penetration, as shown in broken lines. Similarly when the main frame 1 resumes its horizontal position with the eccentric plate stopped in the vertical position, the auxiliary frame will be held in an elevated position parallel to the main frame with the tines well above the ground for transportation purposes.

Figures 4, 5:
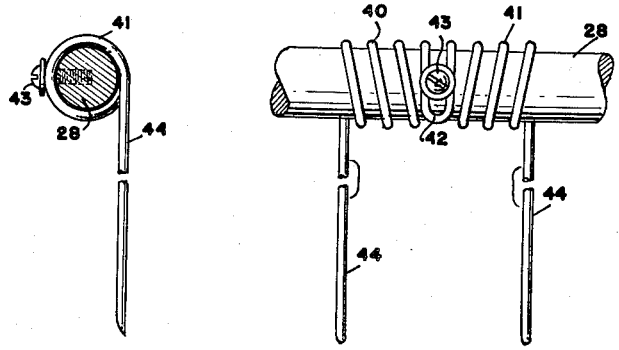
Figure 4 is an enlarged detail view of a typical raking member.
Figure 5 is a view of the righthand end of Figure 4.

Each of the cross rods 28 of the raking frame is provided with spaced apart raking members 39 each of which as best illustrated in Figures 4 and 5 comprises a single length of wire wrapped about its respective rod 28 in two different directions as at 40 and 41 to provide a looped intermediate portion 42 through which a fastening screw 43 extends for securing the raking member to the rod. The ends of the wire extend downwardly from the supporting rod 28 in parallel relation to each other to provide raking tines in the form of spring fingers 44 which may be adjusted in angular relation to the ground by means of the looped central portion 42 and the fastening screw 43.

Figure 3:
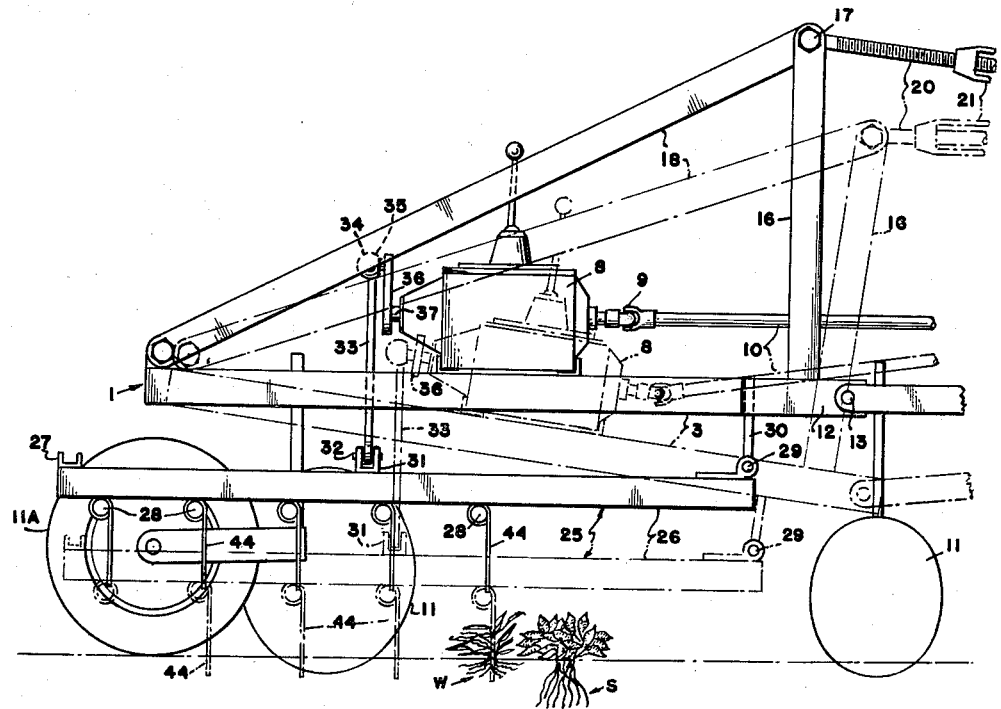
Figure 3 is a side view, on an enlarged scale, of Figure 2.

As best illustrated in Figure 3, the main forward end of the frame may be tilted downwardly into a set position relative to the ground by advancing or retracting the turnbuckle 20 on the threads of the shafts 19 and 21 and at the same time vertically adjusting the supporting shafts of the forward harrow discs 11 relative to the forward end of the main frame. By this arrangement the raking frame 25 can be raised or lowered into various starting positions parallel to the ground as aforesaid and as indicated by full and broken lines to thereby determine the extent that the bottom ends of all the rake tines 44 will penetrate the ground to the same depth and as necessary to extirpate roots W of the weeds shown in Figure 3 and at the same time not damage the lower and sturdier roots S of row crops such as strawberries or the like. As the attachment travels forwardly with the towing vehicle, rotation of the eccentric plate 36 by the power transmission 8 will impart reciprocal vertical motion to the raking frame by means of the pitman 33. This action of the raking frame will cause the rake tines 44 to penetrate the ground intermittently at spaced intervals with a forwardly horizontal sweeping motion from the point of penetration to the point of withdrawal. The spacing and frequency of penetration is, of course, controlled by the towing speed, the r.p.m. of the tractor engine and/or the manually selected gear ratio of the power transmission means.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A farming implement of the character described comprising a main frame having a forward end and a rearward end and supported at its rearward end by ground engaging wheels, means attaching the forward end of the main frame to a towing vehicle, means interconnecting the forward end of the main frame with the towing vehicle for raising and lowering said forward end of the main frame relative to the ground, a manually controlled variable speed power transmission means superimposed upon the main frame and adapted for operative coupling to a power take-off of a towing vehicle, an auxiliary frame disposed below said main frame and having a forward end and a rearward end, a plurality of straight vertically disposed tines extending downwardly from said auxiliary frame spaced apart entirely thereacross and arranged in parallel rows spaced apart lengthwise of said auxiliary frame, said power transmission means having a power output shaft, an eccentric plate secured at one of its ends to said power output shaft for rotation therewith, a pitman interconnecting the other end of said eccentric plate with said auxiliary frame intermediate the ends thereof, said forward end of the auxiliary frame being hingedly suspended from said main frame by brackets equal in length to the length of said eccentric plate whereby when said main frame is tilted downwardly relative to the ground said auxiliary frame will be lowered into a horizontal operating position relative to the ground by said eccentric plate and whereby all of said tines will penetrate the ground to a uniform depth and whereby rotation of the eccentric plate will impart reciprocal motion to the auxiliary frame and the spacing and frequency of penetration of the tines into the ground will be controlled by the manually selected speed of said variable speed power transmission means.

References Cited in the file of this patent

UNITED STATES PATENTS

| | | |
|---|---|---|
| 2,161,428 | Pezzolo | June 6, 1939 |
| 2,592,097 | Younger | Apr. 8, 1952 |
| 2,595,537 | Pitcher | May 6, 1952 |
| 2,706,439 | Ellingboe | Apr. 9, 1955 |
| 2,723,611 | Holthouse et al. | Nov. 15, 1955 |
| 2,791,952 | Coviello | May 14, 1957 |

FOREIGN PATENTS

| | | |
|---|---|---|
| 5,123 | Australia | of 1926 |